Jan. 22, 1957　　　　J. J. MANCUSI, JR　　　2,778,339
BY-PASS VALVE MEANS FOR HYDRAULIC SERVO SYSTEM
Filed June 9, 1953　　　　　　　　　　　　　3 Sheets-Sheet 3
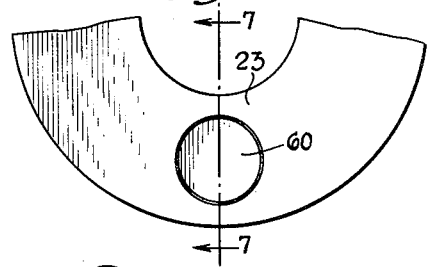
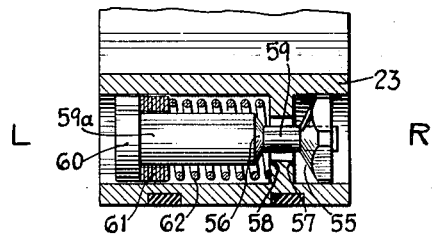
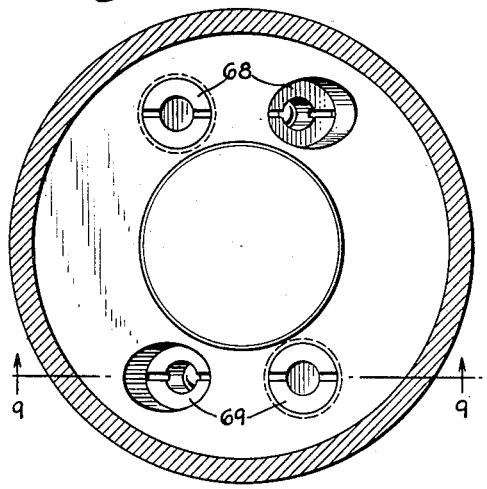
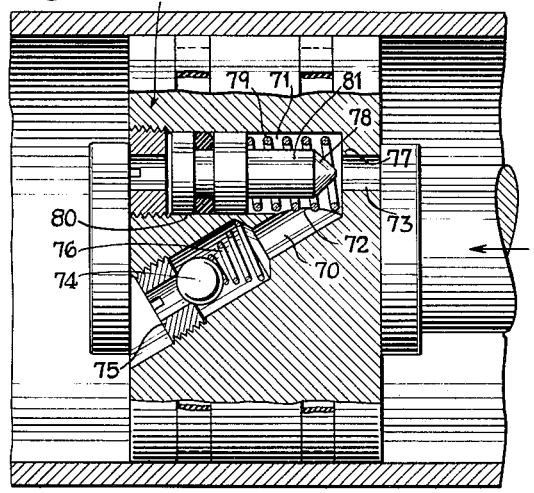
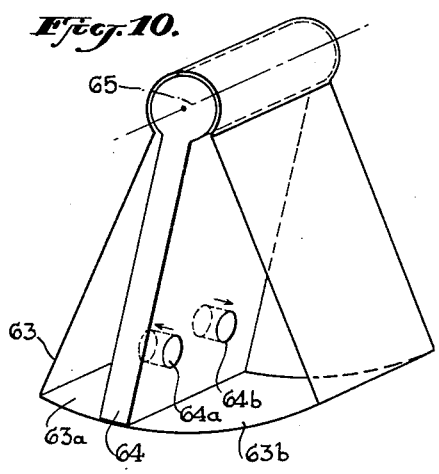
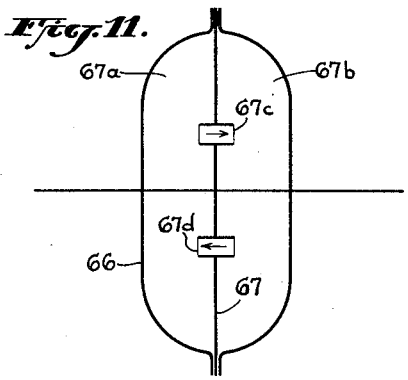
INVENTOR.
JOSEPH J. MANCUSI, JR.
BY
ATTORNEYS.

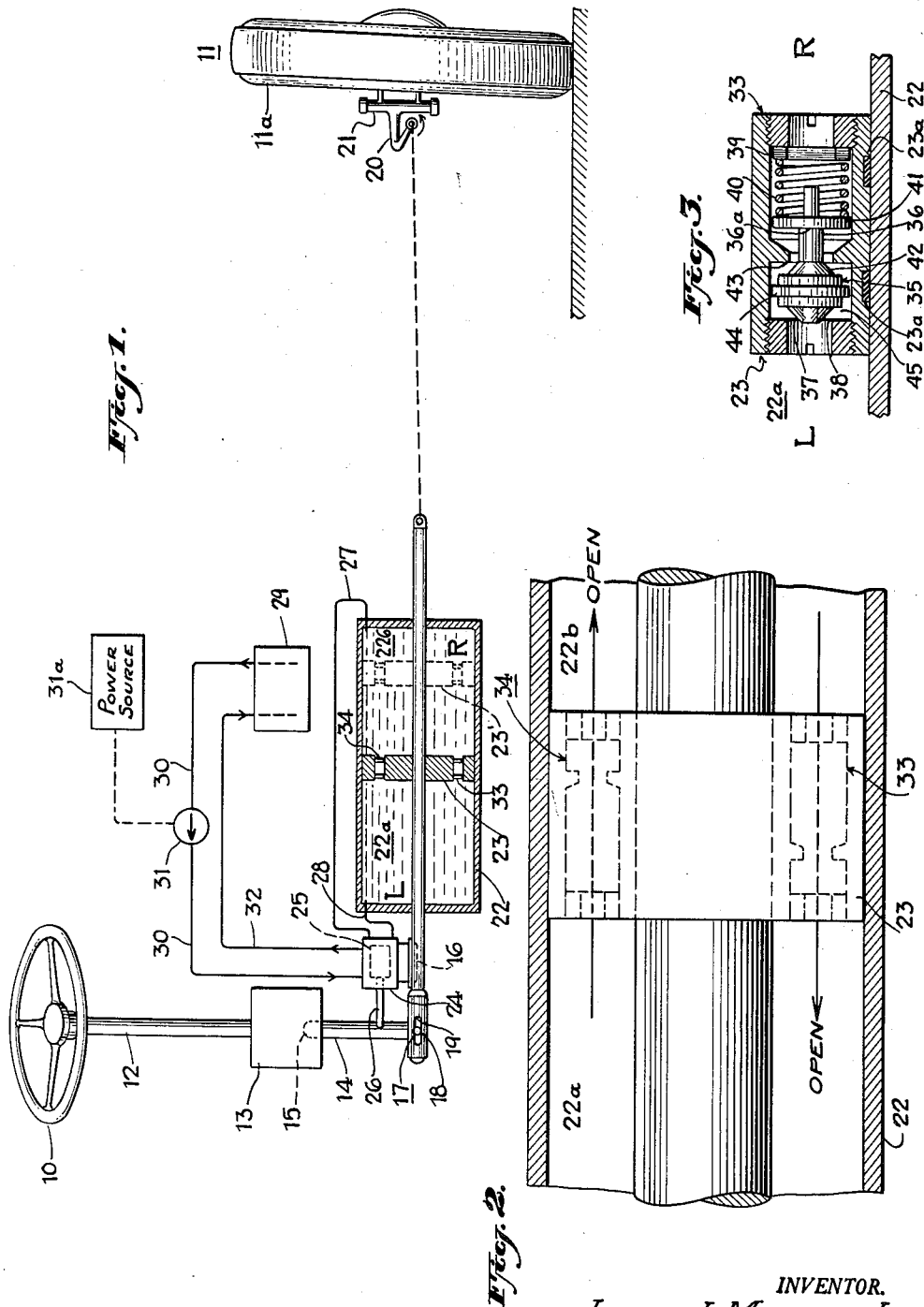

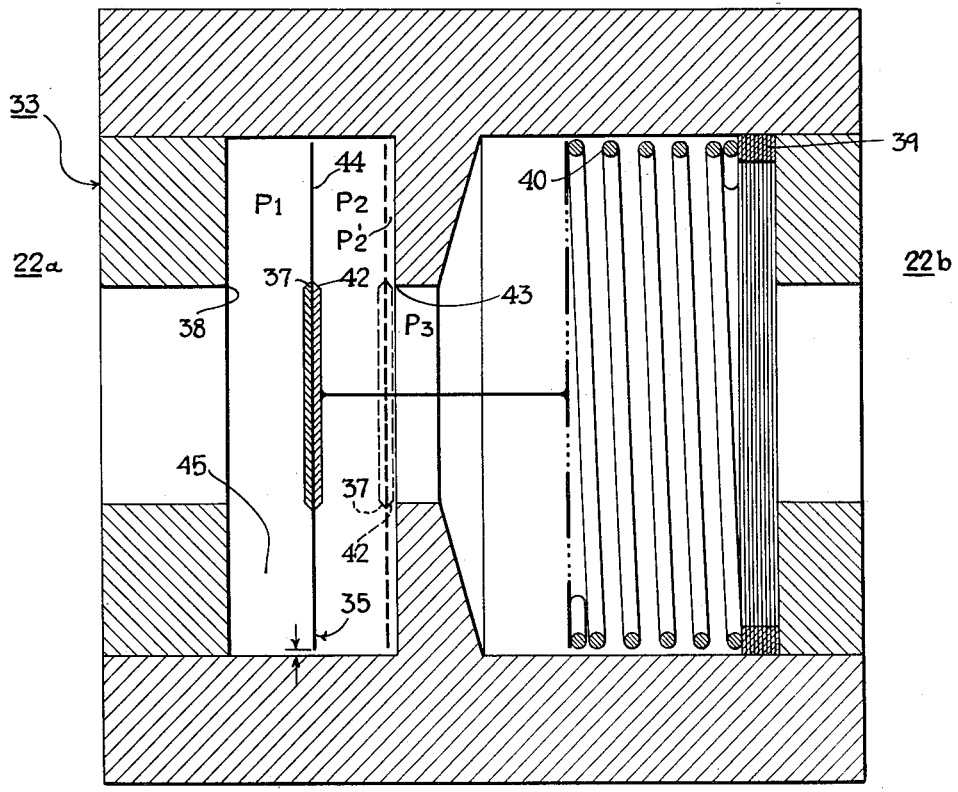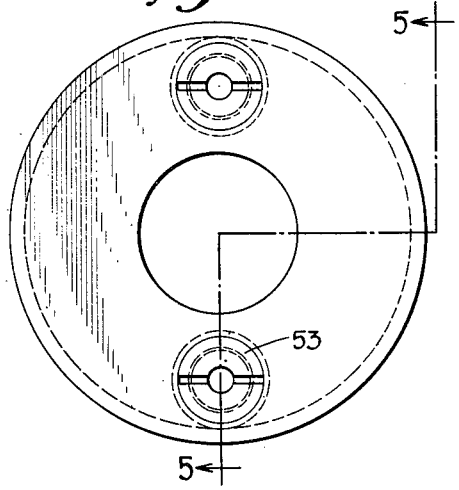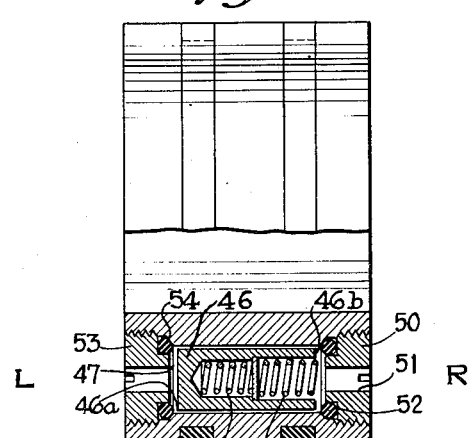

United States Patent Office

2,778,339
Patented Jan. 22, 1957

2,778,339
BY-PASS VALVE MEANS FOR HYDRAULIC SERVO SYSTEM

Joseph J. Mancusi, Jr., Eastchester, N. Y., assignor to Hydra-Power Corporation, New Rochelle, N. Y., a corporation of New York Application June 9, 1953, Serial No. 360,477

8 Claims. (Cl. 121—38)

This invention relates to hydraulic power systems, and more particularly to improvements in hydraulic servo systems such as those which may be employed to assist in the steering of automotive vehicles.

In hydraulic servo systems of this type heretofore proposed, particularly those for so-called "power steering" of automotive vehicles, no satisfactory means have been suggested for automatically suspending the operation of such servo systems (but automatically to except those instances where substantial feedback shocks or forces occur) at higher driving speeds, that is, in excess of some preselected speed such as 20–25 M. P. H. At speeds in excess of such preselected value, the forces required for the steering of the vehicle are substantially reduced and a "power assist" for hand steering is normally not necessary or desirable for most automotive vehicles having conventional mechanical steering devices.

Furthermore, in those types of hydraulically actuated servo systems, where, under certain circumstances, the operation of the servo system is suspended after displacement of the piston element from a norm position and hand power alone relied upon, the piston element (or its equivalent) which has been so displaced under the action of hydraulic pressure, may need to return, for example, to a norm or center position or to some other position. Substantial fluid friction has heretofore characterized the return of such piston element to such position, particularly in the so-called return cycle or "depressurization cycle" which in prior devices has required all of the hydraulic fluid on one side of the piston to move through an unnecessarily long return path to the other side of the piston.

Also such prior hydraulic servo systems employing non-compressible viscous substances, such as oil, are substantially handicapped in cold weather or at any temperature wherein the viscosity of the fluid is substantially increased from a desired operation value.

One of the objects of the present invention is to overcome the above difficulties or to reduce them to insignificance.

A further object is to provide an hydraulically actuated power boosting system which may be employed in a wide variety of environments and which provides improved stability for the element to be moved, such as the front wheels of an automotive vehicle, such system embodying the viscous damping and basic stability features of an hydraulic system, and at the same time greatly minimizing or substantially eliminating the effects of fluid friction which are incidental to the return of the piston element, or its equivalent, to a norm position.

A further object is to provide a novel power boosting system for the steering of automotive vehicles wherein the hydraulic power assistance to the hand of the driver is eliminated, under normal road conditions, above a preselected vehicular velocity. That is, such a further object is to provide a novel system of this type having improved ability to control and sense low output force feedback characteristics of the steering system wherein relatively small forces acting upon, e. g. vehicle wheels, may be felt at the steering wheel.

A further object is to provide a novel hydraulic power boost system which can still operate easily and desirably in response to a relatively low force, for example, hand force upon a steering wheel, at reduced temperatures in the event the hydraulic power supply is out of operation.

A still further object is to diminish greatly the tendency to produce cavitation within the power chamber or cylinder of an hydraulic servo system, which cavitation heretofore, in large degree, has been incidental to the return stroke of the main driven piston, or its equivalent, in such an hydraulic system.

The invention, in one aspect thereof, comprises a novel power boosting system having novel by-pass valve means employed in the main hydraulic power piston thereof. That is, novel means are provided for by-passing hydraulic fluid through such piston so that such fluid may flow freely from one side thereof to the other when pressure values within the power cylinder are below a given level. When the fluid pressure on the driving or high pressure side of the piston exceeds a given value, a by-pass valve, which therebelow permitted flow, will close thereby presenting a closed piston surface to the fluid supplied by a main control valve. When fluid pressure on such driving or high pressure side of the piston is reduced below such preselected value, the valve will again open and permit fluid to pass therethrough. Thus in a power boosting system of this character there is employed a casing or power cylinder which defines a chamber having therein a piston (or movably mounted member) which defines within the chamber two separate subchambers which are respectively enlargeable and diminishable in volume in response to the action of fluid under pressure in one subchamber acting on such piston to move same. The main control valve is employed for directing fluid under pressure selectively to one or the other of such subchambers, concurrently allowing the exhausting of fluid from the other chamber. A main control arm (such as a pitman arm of an automotive steering system) may be connected to the piston (e. g. via the piston rod) for moving same, as by manual force, in said chamber. Said main control arm is also operatively connected to said main control valve for actuating same as aforementioned thereby to direct fluid under pressure to that subchamber which will urge the movable member in the same direction as the movement of such main control arm. The interconnection between the pitman arm and the piston is provided with a "lost motion" device to enable the main control valve to direct fluid under pressure to the power cylinder prior to the overcoming or taking up of such lost motion. The aforementioned by-pass valve means comprises a pair of one-way compound by-pass valves mounted in the piston, one for permitting fluid flow only from one side thereof to the other, and the other valve permitting such flow only in the opposite direction. Means are employed for resiliently urging each of said valves towards a closed position. Such resilient means, however, are designed to be overcome at a preselected low pressure, thereby to permit a by-pass of the fluid, within the capacity of the by-pass valve, when such pressure occurs on one side of the piston. However, due to the compound nature of each of such by-pass valves, each will close in response to fluid pressure exceeding a preselected higher valve, suitable resilient means being provided for resisting the second closing of the valve until such higher pressure has been reached.

In another aspect of the invention, each by-pass valve is designed to open the aforementioned relatively low pressure thereby to provide free by-pass of the fluid, within the capacity of the valve, up to a preselected intermediate but higher fluid pressure. This is accomplished by forming the valve means to present a primary effective area to the fluid under pressure during the period that such pressure does not exceed the aforementioned intermediate pressure, the primary valve face and seat during such period being open. However, when such intermediate pressure is reached acting against suitable resilient means, a secondary valve face and seat are closed thereby presenting to the fluid under pressure a secondary effective area which is less than the aforementioned primary effective area. Thus, two areas are effective in the operation of this valve system, the larger area sensing flow and the smaller area sensing pressure existing at the time of valve closure or when there is no flow through the valve. The action of the valve then is such that, as the pressure increases and the valve element tends to close, the amount of flow therethrough is reduced so that the valve tends to open until such time as a sufficiently high pressure has been reached to hold the valve closed against the resilient means when the smaller effective area is acting. This enhances the action of the device in that in the depressurization cycle, the valve tends to open at a pressure value higher than that which would tend to close it so that in the return of the piston element to the neutral or norm position, there is a tendency at all times for the valve to open allowing free by-pass of the fluid from the formerly powered side to the formerly idling side. Thus, the aim of the device is satisfied whereby there is obtained easy retraction of the cylinder under low return load conditions.

Various further and more specific objects, features and advantages of the invention will clearly appear from the detailed description given below taken in connection with the accompanying drawings which form a part of this specification and illustrate, by way of example, preferred arrangements of apparatus for carrying out the invention. The invention consists in such novel combinations of features as may be shown and described in connection with the device herein disclosed.

In the drawings:

Fig. 1 is a schematic representation of an hydraulic power boosting system embodying one form of the invention;

Fig. 2 is a view on an enlarged scale, partly in section and with parts broken away, of a portion of a power cylinder and piston embodying the present invention;

Fig. 3 is an enlarged longitudinal sectional view of the by-pass valve employed in Fig. 2;

Fig. 3a is an enlarged sectional view of a by-pass valve embodying the present invention which is shown partially in schematic form for purposes of clarity and which is patterned substantially upon the embodiment shown in Fig. 3;

Fig. 4 is an end view of a piston having therein another form of such novel by-pass valve;

Fig. 5 is a sectional view taken on line 5—5 of Fig. 4;

Fig. 6 is an end view of a piston having therein still a further form of a novel by-pass valve;

Fig. 7 is a sectional view taken along line 7—7 of Fig. 6;

Fig. 8 is an end view of a piston employing another form of the novel valve means;

Fig. 9 is a sectional view taken on line 9—9 of Fig. 8;

Fig. 10 is a perspective view of further apparatus embodying the present invention; and Fig. 11 is a cross sectional view of still another device which also embodies the present invention.

Referring to the drawings in greater detail, particularly with respect to Figs. 1–3, one form of the present invention is shown comprising an hydraulic system for assisting the driver of an automotive vehicle to steer the latter.

In this form of the invention a steering wheel 10 is mechanically operatively connected to the front wheels 11 of the vehicle, one of which is shown at 11a, by a conventional interconnection comprising the usual steering column 12, a force multiplying device 13, comprising, for example, a suitable gear train or worm and wheel arrangement for greatly increasing the force applied at the steering wheel 10 thereby angularly to shift a pitman arm (main control arm), as at 14. The latter angularly shifts, for example, about a pivot, as at 15, and at its outer extremity is connected to a steering rod 16 by means of a pin and slot interconnection generally shown at 17, the purpose of which will appear below. For example, a pin 18 affixed to the pitman arm 14 engages a slot 19 formed in the lefthand extremity of the rod 16. The opposite extremity of the rod 16, by suitable means, is operatively connected to a steering knuckle 20, one for each of the wheels 11, thereby angularly to shift the front wheels 11 each of which is pivotably mounted upon a king pin 21 in a conventional manner.

In order to provide an improved hydraulic system for giving a "power-assist" to the driver of the vehicle to facilitate the steering of the wheels 11, the following structure is provided: a power cylinder 22 having movable therein a power piston 23 which is rigidly secured to the aforementioned steering rod 16. The power cylinder 22 in the form shown embraces the rod 16 and the latter acts therein as a piston rod. The power cylinder 22 in this embodiment is fixed relative to the driven member, that is relative to the front wheels 11 and fluid pressure acting upon the piston is capable of moving such wheels via the knuckles 20. However, it is within the purview of the invention, of course, to hold the piston 23 stationary and to move the cylinder 22, in which latter case the movable cylinder would be operatively connected to the element which is to be driven, in this case the vehicle wheels 11. Surrounding piston 23 are piston rings 23a (Fig. 3).

Fluid under pressure is directed to the power cylinder 22 by means of a four-way valve means 24 which is also referred to as a main control valve device. The latter is secured to the rod 16 for movement therewith and includes a movable valve element 25 which, by any suitable means, such as a valve rod 26, is connected to the pitman arm 14 and thus is moved thereby. The movable valve control element 25, by its movement, directs fluid under pressure to one or the other of the subchambers 22a or 22b formed on either side of the main piston 23. The valve device 24 is connected to the righthand subchamber 22b by means of a conduit 27 and to the lefthand subchamber 22a by a conduit 28. The system shown preferably employs a non-compressible viscous hydraulic fluid, such as oil, a reservoir for which is shown at 29. The main control valve 24, by means of a pressure conduit 30, is connected to the reservoir 29, there being a pump 31 (driven by a power source, such as engine 31a) interposed in such conduit for forcing oil under pressure to the valve device 24 and thence to either the left or righthand subchamber 22a or 22b. An exhaust conduit from the main valve control device 24 is shown at 32 and directs exhaust fluid into reservoir 29 from that subchamber, the fluid of which is being exhausted into the reservoir 29.

Assume, for example, that it is desired to shift the front wheels 11 angularly upon the king pin 21 in the direction of arrow 11a. This is accomplished by turning the steering wheel 10 which will angularly shift the pitman arm 14 counterclockwise (Fig. 1) thereby to move the valve element 25 in the same direction. Pin 18 is normally positioned intermediate the extremities of slot 19. Before this pin reaches an end of the slot 19, fluid under pressure will be directed to the lefthand subchamber 22a within the cylinder 22 thereby forcing the main piston 23 to the right (Fig. 1), for example, to the position shown in broken lines at 23'. In the absence of the novel by-pass valve located in the main piston 23, the return of such piston to a norm position, such as the centered position shown in solid lines, will require all of the fluid in the subchamber 22a involved in the above noted displacement to return to the opposite subchamber 22b via: the conduit 28, the valve device 24, conduit 32, reservoir 29, conduit 30 having pump 31 therein, back to valve device 24, and thence conduit 27. This obviously entails substantial energy losses due to friction and also substantial time losses. For these and other reasons, as will appear below, novel by-pass valve means are mounted in the main piston 23 for the purpose of permitting, under special circumstances, hydraulic fluid from one subchamber, as at 22a, to move directly to the other subchamber, as at 22b, without detriment to the viscous damping effects and basic stability of the hydraulic system and in fact tending to enhance the stable character of the system. Furthermore, the novel by-pass valve means, as aforementioned, are effective gradually and in accordance with a preselected change rate to diminish the "power-assist" of the hydraulic system as the speed of the vehicle increases. However, should extraordinary forces act upon the wheels 11, the "power-assist" of the hydraulic system automatically is reinstated, assuming that such unusual forces (referred to in power steering systems as rim forces) are capable of feeding back into the power cylinder to create in one of the subchambers therein a fluid pressure in excess of a preselected value.

Since main valve device 24 is secured to rod 16 for movement therewith, the main piston 23 will move in proportion to the displacement of the steering wheel 10 and pitman arm 14.

Referring now to Figs. 2 and 3 and 3a, the novel by-pass valve means comprise a pair of one-way compound by-pass valves indicated generally at 33 and 34, the former of which is oriented to permit fluid flow from left to right and the latter in an opposite direction, as viewed in Fig. 2.

The novel one-way compound by-pass valve 33 (Fig. 3) will now be described, it being understood that the other valve 34 is identical thereto but arranged to permit fluid flow in an opposite direction. The valve 33 comprises a movable valve element 35 including a shaft 36. The movable valve element 35 is provided with a primary valve face 37 formed for cooperating with a primary valve seat 38, such face and seat being at the lefthand extremity of the valve element and being separable in response to pressure acting from the left toward the right, as viewed in Fig. 3. Such primary valve face and seat are urged toward a closed position resiliently by resilient means comprising, for example, a check spring 39 which acts thereupon, in the form shown, through the intermediary of a relatively heavier and stronger spring 40 which is referred to as a valve spring, and which is interposed between the check spring 39 and a valve spider 41, the latter being secured to the valve shaft 36 and resting upon a suitable shoulder thereon, as at 36a, for the purpose of transmitting the thrust of such springs to the valve element 35. As will appear below, the heavier valve spring 40 is not subject to distortion until after the primary valve face and seat (37, 38) have separated a substantial amount. Consequently the check spring 39 urges such primary elements (37, 38) of the valve to a closed position thereby to prevent fluid flow from right to left, as viewed in Fig. 3.

Fluid flow is permitted by the novel structure from left to right through the passage of the valve 33 providing the pressure differential acting on opposite sides of the valve 35 does not exceed a preselected value. For this purpose a secondary valve face 42 is provided for cooperating with a secondary valve seat 43.

Interposed between the valve seats 37 and 42 is a valve disc 44 preferably of circular shape having an outer diameter slightly less than the inner diameter of a valve chamber 45 in which said valve disc is movable. The flow of oil through the by-pass valve thus is via the annular opening existing between the periphery of the valve disc 44 and the inner surface of the valve chamber 45.

At some preselected point in the movement to the right of the valve element 35, normally when the check spring 39 is fully collapsed, as shown in Fig. 3, the main valve spring 40 is effective to resist resiliently the rightward forces acting upon such valve element 35. For example, when the valve element 35 is approximately in its mid position, said main valve spring 40 may come into operation to resist such movement to the right, as viewed in Fig. 3.

As the pressure on the left side of the valve element 35 (and thus on the left side of the piston 23) increases to a level which will overcome the force of the main spring 40, the valve element 35 will be driven to the right thereby ultimately driving the secondary valve face 42 into engagement with the secondary seat 43 and thus preventing the passage of fluid from left to right and allowing the fluid on the left side of the piston 23 to deliver against such piston the total energy imparted to the fluid by the pump system in the subchamber 22a.

In operation of the embodiments shown in Figs. 1-3 and 3a, it will be seen that within the capacity of the one-way compound by-pass valve 33 there is a free flow of fluid from left to right, namely, from subchamber 22a to subchamber 22b, so long as the pressure differential on opposite sides of the valve disc 44 is predominant on the lefthand side thereof thereby to disengage the primary valve face and seat, such pressure differential being less than that required to close the secondary valve face and seat. In this embodiment of the invention there are three pressures which affect the operation of the by-pass valve as follows:

(a) One-way free flow pressure range within the capacity of the valve—for example, from 1 p. s. i. to 7 p. s. i.

(b) The design pressure which is that pressure at which the secondary valve face and seat would remain closed but for the change in effective area upon which the pressure fluid acts, which change occurs incidental to the seating of said secondary valve face and seat.

(c) Full pressure which refers to the pressure at and above which the secondary valve face and seat remain closed regardless of any change in so-called valve effective area.

Referring to Fig. 3a (and assuming subchamber 22b to be open to exhaust), the primary valve face and seat 37 and 38 will remain closed until the fluid in subchamber 22a reaches, for example, 1 p. s. i. at which pressure and above the check spring 39 is overcome and the by-pass valve is open. Between a pressure range of said 1 p. s. i. up to the design pressure, for example, of 7 p. s. i. there will be a free flow of fluid through the passage of the by-pass valve 33 within the flow capacity of such valve. The force tending thus to urge the by-pass valve open is expressed as follows: $f = A_1(P_1 - P_2)$ wherein $P_1$ is the pressure on the lefthand side of the valve disc 44, $P_2$ on the righthand side thereof, as viewed in Fig. 3, and $A_1$ refers to the area of the valve disc 44, that is $\pi r^2$, wherein $r$ is the radius of such disc. When the valve element 35 is moved to the right to the point where the secondary valve face 42 engages the secondary seat 43, it will be seen that the lower "effective area" is presented to the fluid under pressure and furthermore, that there is no pressure drop occasioned by fluid flow around the valve disc 44 in view of the closing of said secondary face and seat. Thus the force tending to hold the secondary face and seat closed is expressed as follows: $f_1 = A_2(P_1 - P_3)$ wherein $A_2$ refers to the smaller effective area of the valve, namely, $\pi r^2$ wherein $r$ is the radius of the secondary valve face 42.

In closing the valve in the manner described, the pressure acting to close the valve (thereby first to press the check spring 39 and thereafter the main spring 40) is a function of:

(a) The flow around the valve, and
(b) The pressure drop incidental thereto.

The former is a function of the annular opening between the periphery of the valve disc 44 and the inner surface of the valve chamber 45. The pressure drop is, of course, a function of the force of the spring which opposes movement of the valve in the direction for closing, that is, a function of the resistive force of the valve spring 40 which resists the closing of the secondary valve face and seat.

During such function of the valve 33, the diametrically opposed valve 34 acts as a check valve preventing reverse flow from the low pressure side of the piston 23 and thus blocking passage through the piston from right to left, as viewed in Fig. 2.

Thus when the secondary valve face and seat are engaged, the valve is held closed by a pressure acting on a substantially smaller effective area ($A_2$) than that against which the pressure drop worked ($A_1$) while the valve is in the process of being closed. Thus until such time as the fluid pressure on the high pressure or "power" side of the piston reaches so-called "full pressure" to securely maintain the secondary face on the secondary seat, the valve element 35 has a tendency to return to its open position. The advantages arising from this feature, as applied particularly to automotive steering are, for example: greater directional stability due to the fact that the force resisting the return to the dead ahead position is greatly reduced by virtue of the by-pass valve action which allows free flow of the hydraulic fluid from the formerly "powered" side of the piston to the opposite side thereof thereby providing better release characteristics.

Referring now to Figs. 4 and 5, the by-pass valve shown generally is similar in operation to that above described with the exception that the aforedescribed values $A_1$ and $A_2$ are equal to one another and thus the design and full pressures are substantially equal.

The by-pass valve comprises a hollow cylindrical valve element 46 which is movable within the valve passage 47, the inner diameter of which is somewhat larger than the outer diameter of the valve element 46, thereby providing a suitable annular opening for the flow of fluid. The valve element 46 acts as a one-way valve to prevent flow of fluid from the right to left, as viewed in Fig. 5, by virtue of check spring 48 mounted within the cylindrical element 46 and communicating its relatively low thrust to such valve element through the intermediary of the main valve spring 49 which is interposed between the latter spring and a threaded valve collar 50 having a passage 51 therethrough. The collar 50 holds in place a suitable O-ring 52 which acts as a secondary valve seat. A similar collar 53 is mounted at the opposite extremity of the by-pass valve and holds in place an O-ring 54 comprising a primary valve seat. The annular margin area, as at 46a, on the lefthand extremity of the valve element 46 acts as the primary valve face. Conversely, the annular area 46b at the righthand extremity of the valve element 46 acts as the secondary valve face.

The spring 49 reaches its maximum extended position in the condition shown in Fig. 5 and thus is incapable of urging the valve element 46 to the left beyond its position shown in such Fig. 5. The weaker of the two springs, namely, 48, takes over and urges the valve element 46 to the left alone after the maximum extension of the spring 49. The spring 48 is compressed to the maximum extent possible by the valve structure shown when valve element 46 is in the position shown in Fig. 5 wherein the washer (which separates the two springs 48 and 49) is urged to its farthest position to the left (Fig. 5) and thus is in engagement with the shoulder formed internally in the recess of the valve element 46 in which such springs move.

The operation of the embodiment of the by-pass valve shown in Fig. 5 is identical to that shown in Figs. 3 and 3a with the exception that the valve checks the flow of fluid from left to right when the "design pressure" is reached which, in this form, is equal to the full pressure.

The embodiment of the by-pass valve shown in Fig. 7 is similar in function and operation to that shown in Fig. 3 but differs somewhat in form. Primary and secondary valve faces are shown respectively at 55 and 56 and interposed therebetween are respectively primary and secondary valve seats 57 and 58. The embodiment of Fig. 7 also acts as a one-way by-pass valve to prevent the flow of fluid from left to right, as viewed in this figure, and to permit flow in the reverse direction under the limited circumstances outlined above in connection with the embodiment of Fig. 3. The valve face elements 55 and 56 are integral with an interconnecting valve shaft 59 which is sufficiently restricted to provide an adequate passage for the flow of fluid between the aforementioned primary and secondary valve seats. Such valve seats in combination provide a throat which is relatively restricted as compared to the remainder of the passage through which the fluid may flow. A valve disc 60 is provided analogous to the aforementioned valve disc 44. The clearance between it and the inner surface of the valve passage provides an annular opening through which the fluid may flow. The valve disc 60 is rigidly secured to the secondary valve face 56 by means of a valve portion 59a of relatively enlarged diameter. The primary valve face and seat are urged toward a closed condition by means of a check spring 61 acting on one side thereof upon the disc 60 and on the other side thereof upon the body of the piston 23 via a main valve spring 62 which functions analogously to the main valve spring 40.

The novel by-pass valve means are not restricted in their use to combination with power piston means of the type shown in Fig. 1 but may be employed for by-pass purposes in connection with a device, such as that shown in Fig. 10, having a segmental shaped casing, as at 63, and further having a movable member 64 mounted therein for angular movement about an axis 65. The casing 63 defines a chamber which is separated into two subchambers 63a, 63b by the movable member 64. Such casing may be operatively connected to a pressure fluid system analogous to that shown in Fig. 1. By-pass valves, as at 64a and 64b may be employed.

Also the novel by-pass valve means may be employed in connection with a diaphragm casing, such as that shown at 66 (Fig. 11) having therein a flexible diaphragm 67, the margin of which is fixedly secured to the casing thereby to seal the chamber defined by the casing 67 into two subchambers 67a and 67b. One or more such by-pass valves, as at 67c, can be mounted in the diaphragm for allowing fluid flow in one direction, and one or more such valves, as at 67d, can be so mounted for permitting fluid flow in the opposite direction.

Referring now to the embodiments of Figs. 8 and 9, the valve means are shown as two distinct valve assemblies. The upper valve assembly 68 (Fig. 8) at fluid pressures below the so-called design pressure allows flow from right to left (Fig. 9) and prevents flow from left to right. The lower valve assembly 69 allows flow from left to right at subdesign pressures and prevents flow from right to left (Fig. 9).

Considering the lower valve assembly 69 only for purposes of description, two separate valve passages are provided at 70 and 71. These passages merge, as at 72, and have a common outlet at 73. In the valve passage 70 there is provided a ball check valve 74 which is held against its seat 75 by a check spring 76. Its function is analogous to the primary valve and seat described above. A secondary valve seat 77 is provided for cooperating with a secondary valve face 78 which is held in an open position by means of a main valve spring 79 acting upon a valve disc 80, the latter being analogous to the valve disc 44 above described. The action of the main valve spring 79 against a secondary valve element 81 will hold the secondary face off of its seat at pressures below the "design pressure." Thus fluid is free to pass the ball check valve 74 through the outlet orifice 71 past the secondary face and seat.

Thus the hydraulic action against the area of the main piston 23 will not be in terms of the full pressure working against the area of the main piston 23 but will be a function of the pressure drop through the entire valve train. Such pressure drop or pressure differential will act against the "effective area" of the main piston 23. Although some force is effective at all times when fluid under pressure is introduced into the subchamber 22a, the magnitude of the force may be controlled by the flow capacity of the valve means shown in Fig. 1, that is, the flow area for which such valve means are designed.

When the pressure on the left side of the piston increases to the so-called "design pressure" it will overcome the force of the main spring 79 and the secondary valve face will be driven to its seat thus preventing passage of the fluid through the orifice 73 and thereby causing the fluid on the left side of the main piston 23 to deliver against such piston the total energy imparted to the fluid by the pump system. The effective area against which the fluid pressure in subchamber 22a acts to hold the secondary face and seat closed is that of the secondary valve face 78 which is substantially smaller than the area of the valve disc 80. Consequently an ascending pressure is required to hold the secondary face closed over and above the so-called design pressure but below the full pressure. The tendency therefore is for the secondary valve face to open at fluid pressures beneath the full pressure.

The valve disc 80 is sometimes referred to as a poppet and the secondary face sometimes as a poppet face. The ratio of closing to opening pressure of the poppet piston may be predetermined in the diameter of the poppet piston and the poppet face.

Since the force required for steering a vehicle gradually diminishes as the speed increases, it will be seen that at lower speeds the power boosting system will provide an adequate "power-assist" to the driver but as the speed increases the "power assist" will gradually diminish by virtue of the by-pass characteristics of the novel by-pass valves above described so that in the absence of abnormal shocks exerted upon the vehicle wheels, the driver will be able to steer the vehicle by direct mechanical control.

While the invention has been described with respect to certain preferred examples which have given satisfactory results, it will be understood by those skilled in the art, after understanding the invention, that various changes and modifications may be made without departing from the spirit and scope of the invention, and it is intended therefore in the appended claims to cover all such changes and modifications.

What is claimed is:

1. In an hydraulically actuatable system: a casing defining a chamber; a member movably mounted in such casing and forming therein two separate subchambers, a selected one of such subchambers being enlargeable, the other being concurrently diminishable in volume in response to movement of such member; and a pair of oppositely facing one-way compound by-pass valves in said movable member for permitting flow through such movable member respectively in opposite directions, each of such valves having means for resiliently urging same closed against a preselected low pressure acting in the respective flow direction of the valve, each of said valves having means for closing same to stop the flow in such respective direction in response to pressure acting in such direction reaching a preselected higher value.

2. In a fluid actuatable system: a casing defining a chamber; a member movably mounted in such casing and forming therein two separate subchambers, a selected one of such subchambers being enlargeable, the other being concurrently diminishable in volume in response to movement of such member; and a pair of oppositely facing one-way by-pass valves in said movable member for permitting fluid flow through such movable member respectively in opposite directions, each of such valves having means for resiliently urging same closed against a preselected low fluid pressure acting in the flow direction of the particular valve, each of said valves having means for closing same to stop such fluid flow in response to pressure acting in its flow direction reaching a higher value.

3. In a power boosting system, the combination of: a casing defining a chamber; a member movably mounted in such casing and defining therein two separate subchambers which are selectively respectively enlargeable and diminishable in volume in response to movement of such member; a main control valve for directing fluid under pressure selectively to one of such subchambers; a control element operatively connected with said movably mounted member for moving same in said chamber, said arm being operatively connected to said main control valve for actuating same in advance of the communication of force to said member by said control element thereby to direct fluid under pressure as aforementioned selectively to one of such subchambers thereby to urge said movable member in the same direction as the movement of such control element; and a pair of one-way compound by-pass valves in said movable member, one positioned for permitting fluid flow from one side thereof to the other and the other valve positioned for permitting such flow in the opposite direction, each of said valves having resilient means for urging same to a closed position, and each of said valves being openable at a preselected low pressure and being closable at a preselected higher pressure acting in the same direction as such lower pressure.

4. In a power boosting system, the combination of: a casing defining a chamber; a member movably mounted in such casing and defining therein two separate subchambers which are selectively respectively enlargeable and diminishable in volume in response to movement of such member; a main control valve for directing fluid under pressure selectively to one of such subchambers, the fluid from the other subchamber concurrently being allowed to flow therefrom as an exhaust; a control arm connected with said movably mounted member for moving same in said chamber, said arm being operatively connected to said main control valve for actuating same to direct fluid under pressure as aforementioned selectively to one of such subchambers thereby to urge said movable member in the same direction as the movement of such control arm; and a pair of one-way compound by-pass valves in said movable member, one positioned facing for permitting fluid flow from one side thereof to the other and the other valve positioned facing for permitting such flow in the opposite direction, each of said valves having resilient means for urging same to a closed position, and each of said valves being openable at a preselected low pressure and being closable at a preselected higher pressure acting in the same direction as such lower pressure.

5. In an hydraulically actuatable power system, the combination comprising: a main cylinder; a main piston within and movable relative to said cylinder thereby forming separate chambers on opposite sides of said piston within said cylinder; control means for directing fluid under pressure into either of such chambers; one-way by-pass valve means in said piston for permitting fluid to flow in one direction only from one side to the other of such piston, such one-way by-pass valve means being positioned within a valve passage having a primary and a secondary valve seat formed therein, a valve element positioned for movement in such passage and having primary and secondary faces for engaging respectively said primary and secondary valve seats, primary resilient means for urging said primary face and seat into engagement thereby to prevent fluid flow in a first direction through such passage, said primary resilient means being subject to relatively low pressures acting upon said valve element to open same thereby to permit fluid flow through said passage in an opposite direction, said valve element being formed to provide a primary effective area upon which such fluid pressure may act in so overcoming said primary resilient means, secondary resilient means for resiliently restraining the movement of said movable valve element after said primary resilient means has been overcome thereby to prevent resiliently the engagement of said secondary valve face with said secondary seat, said secondary face and seat when in engagement presenting a secondary effective area upon which such fluid under pressure may act for maintaining said secondary face and seat in engagement, said effective secondary area being smaller than said primary effective area, said by-pass valve means having, in response to the disengagement of said primary seat and face, a normal fluid passage of preselected restriction, said secondary resilient means being effective resiliently to resist the engagement of said secondary face and seat prior to the movement of said secondary face and seat to a point where the restrictive effect thereof to fluid flow is greater than that of the aforementioned preselected restriction; and a second one-way by-pass valve means similar to that set forth above but positioned for preventing flow in an opposite direction.

6. In an hydraulically actuatable power system, the combination comprising: a main cylinder; a main piston within and movable relative to said cylinder thereby forming separate chambers on opposite sides of said piston within said cylinder; control means for directing fluid under pressure into either of such chambers, one-way by-pass valve means in said piston for permitting fluid to flow in one direction only from one side thereof to the other, such one-way by-pass valve means being positioned within a valve passage having a primary and a secondary valve seat formed therein, a valve element positioned for movement in such passage and having primary and secondary faces for engaging respectively said primary and secondary valve seats, primary resilient means for urging said primary face and seat into engagement thereby to act as a oneway valve and to prevent fluid flow in a first direction through such passage, said primary resilient means being subject to relatively low pressures acting upon said valve element to open same thereby to permit fluid flow through said passage in an opposite direction, said valve element being formed to provide a primary effective area upon which such fluid pressure may act in so overcoming said primary resilient means, and secondary resilient means for resiliently restraining the movement of said movable valve element after said primary resilient means has been overcome thereby to prevent resiliently the engagement of said secondary valve face with its seat, said secondary face and seat when in engagement presenting a secondary effective area upon which such fluid under pressure may act for maintaining said secondary face and seat in engagement, said effective secondary area being smaller than said primary effective area, said by-pass valve means having, in response to the disengagment of said primary seat and face, a normal fluid passage of preselected restriction, said secondary resilient means being effective resiliently to resist the engagement of said secondary face and seat prior to the movement of said secondary face and seat to a point where the restrictive effect thereof to fluid flow is greater than that of the aforementioned preselected restriction.

7. In a fluid actuatable power system, the combination comprising: a drivable member; a main cylinder; a main piston positioned within and movable relative to said cylinder thereby forming chambers on opposite sides of said piston; means for operatively interconnecting said piston with said drivable member; main valve means for controlling the flow of fluid under pressure selectively into one of said chambers; a driving member operatively connected to said piston, said driving member also being operatively connected to said main valve means to actuate same thereby to actuate said power system to provide a boost in the force acting upon said drivable member; a one-way by-pass valve formed within passage means interconnecting opposite sides of said piston, said passage means having formed therein primary and secondary valve seats, a primary valve element movable in said passage means having a face for engaging said primary seat, primary resilient means for urging said face of said primary valve element into engagement with said primary seat, said primary valve element permitting fluid flow in one direction only through such piston, a secondary valve element having a valve face for engagement with said secondary valve seat thereby to close said passage means and to prevent the flow of fluid in the direction last mentioned, secondary resilient means for urging said secondary valve element towards an open position, said secondary valve element being closable in response to a substantially higher pressure than that required for the opening of said primary valve element.

8. In an hydraulically actuatable power system, the combination comprising: a drivable member; a main cylinder; a main piston positioned within and movable relative to said cylinder thereby forming chambers on opposite sides of said piston; means for operatively interconnecting said piston with said drivable member; main valve means for controlling the flow of hydraulic fluid under pressure selectively into one of said chambers; a driving member operatively connected to said piston, said driving member also being operatively connected to said main valve means to actuate same thereby to actuate said power system to provide a boost in the force acting upon said drivable member; a one-way by-pass valve formed within passage means interconnecting opposite sides of said piston, said passage means having formed therein primary and secondary valve seats, a primary valve element movable in said passage means having a face for engaging said primary seat, primary resilient means for urging said face of said primary valve element into engagement with said primary seat, said primary valve element permitting flow in one direction only through such piston, a secondary valve element having a valve face for engagement with said secondary valve seat thereby to close said passage means and to prevent the flow of fluid in the direction last mentioned, and secondary resilient means for urging said secondary valve element towards an open position.

References Cited in the file of this patent

UNITED STATES PATENTS

| Number | Name | Date |
|---|---|---|
| 413,631 | Prosser | Oct. 22, 1889 |
| 2,240,039 | Hickman | Apr. 29, 1941 |
| 2,424,233 | Greenough | July 22, 1947 |

FOREIGN PATENTS

| 655,019 | Great Britain | July 4, 1951 |